Patented Feb. 7, 1950

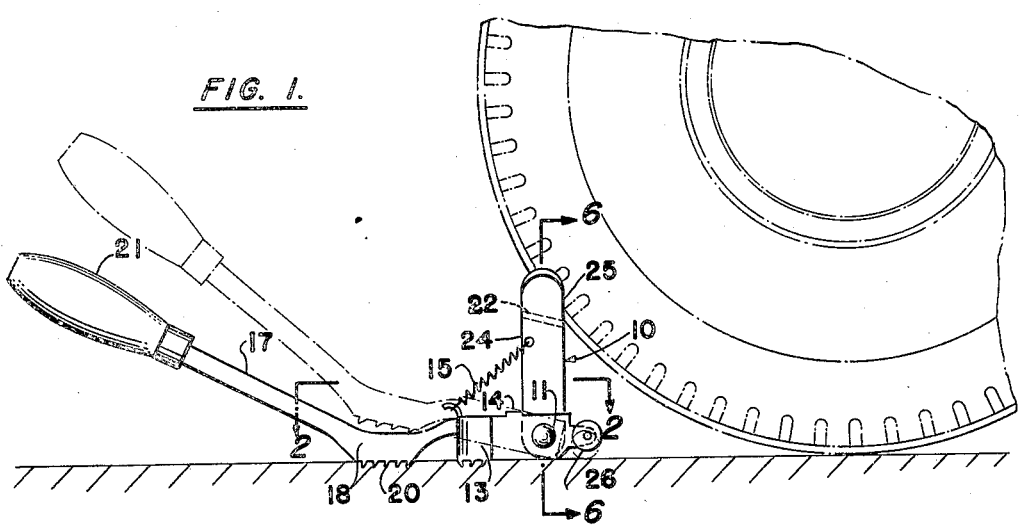
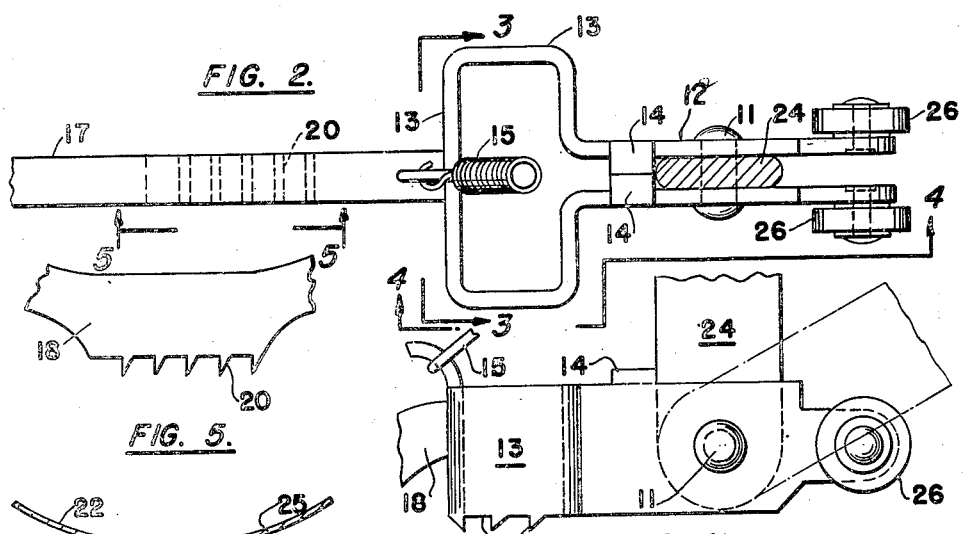
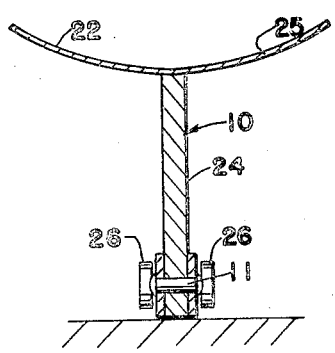
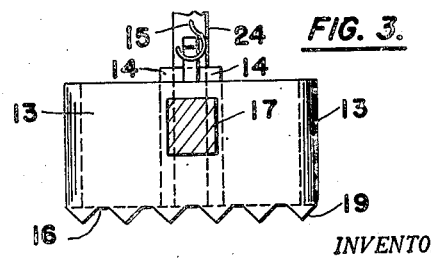

2,496,499

UNITED STATES PATENT OFFICE 2,496,499

WHEEL CHOCK

Alexander P. Slavico, Baltimore, Md.

Application November 10, 1947, Serial No. 784,943

5 Claims. (Cl. 188—32)

This invention relates to vehicle wheels and more particularly to chocks for blocking same when it is desirable to prevent them from rolling in a certain direction of rotation over the surface on which the wheels are placed.

It is an object of the invention to provide a new and improved chock that will avoid one or more of the disadvantages and limitations of the prior art.

Another object of the present invention is to provide a new and improved chock that will facilitate the blocking of pneumatic tired wheels and their placement and removal from such position.

A further object of the invention is to provide a new and improved chock that will be convenient to use with wheels and effective in its operation.

Other objects will become apparent as the invention is more fully set forth.

For a clearer understanding of the invention reference is made to the appended drawings, which together with the following description detail a particular form of the invention by way of example, while the claims designate the scope of the invention.

The drawings illustrate a block for wheels and other round surfaces embodying this invention Figure 1 is a side elevation of a wheel chock embodying this invention, Figure 2 is an enlarged sectional view taken along lines 2—2 of Figure 1, Figure 3 is a view taken along lines 3—3 of Figure 2, Figure 4 is a view looking in the direction of lines 4—4 of Figure 2, Figure 5 is a view looking in the direction of lines 5—5 of Figure 2, and Figure 6 is a sectional view taken along lines 6—6 of Figure 1.

Similar reference characters refer to similar parts throughout the drawings.

In the structure indicated in the drawing, an arcuate T 10 including a stem 24 and contact plate 25 which forms a block proper, that is intended to be set against the peripheral surface of a tired wheel of a vehicle and block it against rotation over it on the ground. The lower portion of the stem of the T is hingedly held by a pin 11 passed through it into a bifurcated member 12. This member is spread out at its rear 13 so as to make a large base that will hold the blocking device in an upright and stationary position. A cross tongue 14 is arranged on the member 12 as a stop to prevent the rotation of the T backwards from its normal perpendicular position, but does not prevent the stem and plate of the T moving in the opposite direction, should there be sufficient stress to cause it. A coil spring 15 tensions the stem of the T towards the perpendicular and keeps it normally against the stop 14. The lower surface portion 16 of the member is V-toothed at 19 to enable it to bite into the ground and resist its movement, when in use. A rod 17 projects angularly from the member 12 to which it is attached in a rearward direction and is formed with a depressed section 18 suitably V-toothed at 20 and adapted to form a fulcrum on which it may be operated, when in contact with the ground. The rod has a handle 21 provided on its end portion and normally located above the ground so it may be handled conveniently by a user. This handle is placed on the rod so it will provide ample leverage when desirable, for the placing or removal of the T from under the periphery of the wheel.

In the operation of the device, the user holds it by the handle 21 and pushes it towards the periphery of the wheel to be chocked, using the fulcrum section and pressure on the handle to manipulate it against the wheel as far as possible. It is then left there. If the wheels of the vehicle blocked rolls against it, it will tend to ride on the arcuate plate surface 22 of the T and bind thereon more securely against rotation. The block may also be used directly under the wheel if it should be jacked up, as a means to hold it up. When the blocking device is to be removed, its handle and rod are raised and pulled back until the portion 22 of the T is loosened from under the wheel. It is then drawn backwards and away from the wheel. If the wheel should press hard on the plate 25, it will cause the latter to bend forward against the tension of the spring 15. This will loosen the T from under the wheel and enable it to be drawn away. The leverage on the fulcrum, facilitates its operation whether for placement or removal.

The tool is convenient to handle and enables the user to operate it without unnecessarily soiling his hand or requiring that he work closely under the wheel and mudguards or vehicle connected therewith. In the use of conventional blocks, the placement or removal of the blocking is a dirty and inconvenient job. This device is compact and may be readily stored away. It is of such form that it may be used for other purposes requiring leverage and lifting operation in which a lifting plate is desirable. Its form also makes it susceptible for production manufacturing at a relatively reasonable cost. A roller 26 is mounted on the front of the member 12 slightly above the level of its lower surface, so that the tilting of the device will enable the roller to roll on the ground and reduce the resistance to the removal of the device.

While but one general form of the invention is shown in the drawings and described in the specifications, it is not desired to limit this application for patent to this particular form or in any other way otherwise than limited by the scope thereof, as it is appreciated that other forms of construction could be made that would use the same principles and come within the scope of the appended claims.

Having thus described the invention, what is claimed is:

1. A blocking device for a wheel, comprising in combination a T plate and stem, a member for supporting said plate and stem in a vertical position, a rod attached to said member for raising and lowering said plate and stem and setting same against the periphery of wheel for blocking same, teeth on said member for inducing resistance to the movement of the device when set as aforesaid, a fulcrum section on the rod for enabling the latter to operate as a lever for the manipulation of the device, a handle on said lever for enabling the rod to be operated at a distance from the plate and stem, hinge means on the stem to permit its rotation on the member in a predetermined direction.

2. A blocking device for a wheel, comprising in combination a T plate and stem, a member for supporting said plate and stem in a vertical position, a rod attached to said member for raising and lowering said plate and stem and setting same against the periphery of wheel for blocking same, teeth on said member for inducing resistance to the movement of the device when set as aforesaid, a fulcrum section on the rod for enabling the latter to operate as a lever for the manipulation of the device, a handle on said lever for enabling the rod to be operated at a distance from the plate and stem, hinge means on the stem to permit its rotation on the member in a predetermined direction, and resilient means for controlling the positioning of the plate and stem.

3. A blocking device for a wheel, comprising in combination a T plate and stem, a member for supporting said plate and stem in a vertical position, a rod attached to said member for raising and lowering said plate and stem and setting same against the periphery of wheel for blocking same, teeth on said member for inducing resistance to the movement of the device when set as aforesaid, a fulcrum section on the rod for enabling the latter to operate as a lever for the manipulation of the device, a handle on said lever for enabling the rod to be operated at a distance from the plate and stem, hinge means on the stem to permit its rotation on the member in a predetermined direction, resilient means for controlling the positioning of the plate and stem, and a stop on the member for keeping the stem and plate in a predetermined position with respect to the handle but having sufficient resiliency to allow a restricted movement of the stem and plate out of such position to facilitate the removal or placement of the device.

4. A blocking device for a wheel, comprising in combination a T plate and stem, a member for supporting said plate and stem in a vertical position, a rod attached to said member for raising and lowering said plate and stem and setting same against the periphery of wheel for blocking same, teeth on said member for inducing resistance to the movement of the device when set as aforesaid, a fulcrum section on the rod for enabling the latter to operate as a lever for the manipulation of the device, a handle on said lever for enabling the rod to be operated at a distance from the plate and stem, hinge means on the stem to permit its rotation on the member in a predetermined direction, resilient means for controlling the positioning of the plate and stem, a stop on the member for keeping the stem and plate in a predetermined position with respect to the handle but having sufficient resiliency to allow a restricted movement of the stem and plate out of such position to facilitate the removal or placement of the device, said members being arranged to form a base enabling the device to rest on the ground with the stem normally disposed in a vertical position, for placement under said wheel.

5. A blocking device for a wheel, comprising in combination a T plate and stem, a member for supporting said plate and stem in a vertical position, a rod attached to said member for raising and lowering said plate and stem and setting same against the periphery of wheel for blocking same, teeth on said member for inducing resistance to the movement of the device when set as aforesaid, a fulcrum section on the rod for enabling the latter to operate as a lever for the manipulation of the device, a handle on said lever for enabling the rod to be operated at a distance from the plate and stem, hinge means on the stem to permit its rotation on the member in a predetermined direction, resilient means for controlling the positioning of the plate and stem, a stop on the member for keeping the stem and plate in a predetermined position with respect to the handle but having sufficient resiliency to allow a restricted movement of the stem and plate out of such position to facilitate the removal or placement of the device, said member being arranged to form a base enabling the device to rest on the ground with the stem normally disposed in a vertical position, for placement under said wheel, and a roller on said member for reducing the resistance to the tilting and withdrawal of the device from the wheel.

ALEXANDER P. SLAVICO.

REFERENCES CITED

The following references are of record in the file of this patent:

UNITED STATES PATENTS

| Number | Name | Date |
|---|---|---|
| 1,317,329 | Shorday | Sept. 30, 1919 |
| 1,521,677 | Fuld et al. | Jan. 6, 1925 |

FOREIGN PATENTS

| Number | Country | Date |
|---|---|---|
| 3,535 | Sweden | Apr. 27, 1892 |
| 552,885 | France | May 8, 1923 |
| 310,185 | Great Britain | Apr. 25, 1929 |